H. HOWARD.
PROCESS OF MAKING BISULFITE OF SODA.
APPLICATION FILED MAR. 17, 1913.
1,104,897. Patented July 28, 1914.
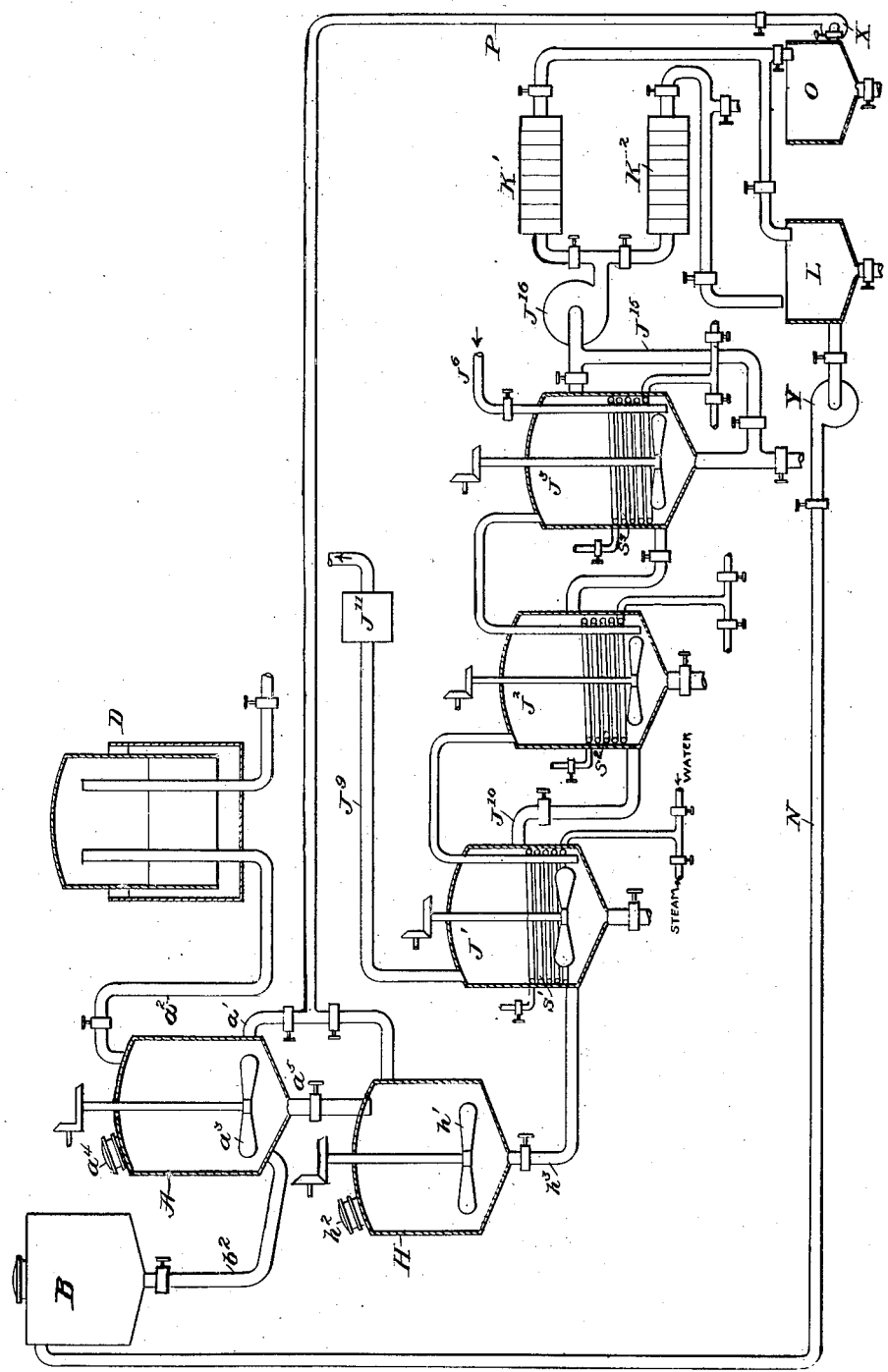

UNITED STATES PATENT OFFICE.

HENRY HOWARD, OF BOSTON, MASSACHUSETTS.

PROCESS OF MAKING BISULFITE OF SODA.

1,104,897.   Specification of Letters Patent.   Patented July 28, 1914.

Application filed March 17, 1913. Serial No. 754,961.

*To all whom it may concern:*

Be it known that I, HENRY HOWARD, a citizen of the United States, residing at Boston, in the county of Suffolk and State of Massachusetts, have invented certain new and useful Improvements in Processes of Making Bisulfite of Soda, of which the following is a specification.

This invention relates to a process for making bisulfite of soda from sulfur dioxid, ordinary salt cake, or a sulfate of soda, and either calcium hydroxid or calcium carbonate. The precipitated calcium carbonate known as "lime mud," a by-product in the manufacture of caustic soda from carbonate of soda, is a useful material in this process and also gives off carbon dioxid which is collected.

In the accompanying drawing, the process is represented diagrammatically.

When calcium carbonate, "lime-mud," is used, a suitable quantity suspended in water is added to tank A through its manhole $a^4$, and kept in suspension by the stirrer $a^3$. Water may be added to this tank through pipe $a^1$. Into the bottom of this agitated mixture is run a solution of sodium bisulfite, through pipe $b^2$ from tank B, from a prior operation or any other source, in such quantity that the calcium carbonate will be decomposed, forming calcium sulfite, sodium sulfite, and carbon dioxid, the latter passing out through pipe $a^2$ into tank D. The sodium bisulfite is run into the bottom of the calcium carbonate in order that the carbon dioxid collected may not be contaminated with sulfur dioxid, which would be the case if the sodium bisulfite was run into the top of the calcium carbonate or lime-mud. After this reaction is completed, the mixed calcium sulfite and sodium sulfite is run through the valved pipe $a^5$ into the sulfate tank H, wherein it is constantly stirred by the stirrer $h^1$. To this solution is added sufficient salt cake, or sulfate of soda, through the manhole $h^2$, to subsequently precipitate the calcium as sulfate of calcium, and water or wash-water from a subsequent operation is added through pipe $P^2$. The thoroughly mixed solutions of sodium sulfite and sodium sulfate with calcium sulfite in suspension are now run through the valved pipe $h^3$ into the first of a series of closed converting tanks of which three, $J^1$, $J^2$, $J^3$, are shown in the drawing, each containing a coiled pipe $S^1$, $S^2$, $S^3$ through which steam or water may circulate to control the temperature of the solutions in the tanks. Each tank further contains a stirrer to keep the contents well stirred. The mixed solution of sulfite and sulfate of soda with calcium sulfite enters the bottom of the first tank $J^1$ from $h^3$ and runs out at the upper part through pipe $J^{10}$, leaving a gas space above; from there it enters tank $J^2$ at the bottom, leaving at the upper part, and enters at the bottom of tank $J^3$, leaving at the upper part, or through by-pass $J^{15}$ to pump $J^{16}$, and then to the filter-presses $K^1$—$K^2$. A stream of sulfur dioxid, such as burner gas, passes through the converting tanks in the opposite direction, entering at the bottom of tank $J^3$ through the pipe $J^6$, and from this tank through tanks $J^2$ and $J^1$, from which it is pumped through the pipe $J^9$ by the pump $J^{11}$ and passed into a suitable absorbing liquid, not shown, wherein any traces of sulfur dioxid are absorbed; the excess of gas then passing out into the atmosphere. Within the converting tanks the temperature is preferably maintained between 45° C. and 65° C., suitable thermometers in each tank serving to aid in the temperature regulation. At temperatures above 65° C., the mass tends to thicken, and is difficult to control, at 90° C., it forms a stiff mortar-like mass; on the other hand, below 30° C., the reaction is very slow. In these tanks the sulfuric acid combined with sodium in the salt cake and sodium sulfate reacts with the calcium sulfite to form calcium sulfate, sodium sulfite also being formed. The sodium sulfite combines with the sulfur dioxid and water present to form sodium bisulfite, the mixed solutions being constantly stirred, as above noted; the several reactions are completed when the solutions leave tank $J^3$. The sodium bisulfite and calcium sulfate are now pumped into the filter-presses $K^1$, $K^2$, one being used while the other is being cleaned; when passing through filter $K^1$, the outlet valves are so arranged that the finished liquor, sodium bisulfite, runs into storage tank L; as soon as the filter is filled with the precipitate of calcium sulfate, the valves are changed, the mixed solution of sodium bisulfite and sulfate of calcium is passed into filter $K^2$, and its finished solution, sodium bisulfite, passes into the storage tank. Filter $K^1$ is now washed and cleaned, the wash-water run into tank O, from which it may be pumped by pump X into the sulfate tank H through pipe P, or into tank A, when desired. A portion of the bisulfite solution in tank L is pumped by pump Y through pipe N into the tank B for a subsequent operation as above noted.

With the above method, the carbon dioxid in the "lime-mud" or other carbonate is recovered; if, however, its recovery is not desired, the lime-mud or other carbonate is mixed with its molecular equivalent of salt-cake or sodium sulfate and water, in tank H; the mass is now run into the converting tanks $J^1$, $J^2$, $J^3$ and treated with burner gas, care being taken to maintain the temperature between 45° C. and 65° C., as above described. The reaction between the lime-mud, sodium sulfate and sulfur dioxid forms calcium sulfate, sodium sulfite, and carbon dioxid, the latter passing into the atmosphere through pipe $J^9$. The sodium sulfite combines with more sulfur dioxid forming sodium bisulfite, and the mass of bisulfite and calcium sulfate is now pumped into the filter presses, as described.

When calcium hydroxid is used, it is run direct into tank H, water being present to keep the hydroxid suspended, and stirred; the molecular equivalent of salt cake, or sodium sulfate is added thereto, so that all the calcium hydroxid and sulfuric acid will combine to form calcium sulfate and water. The thoroughly mixed and agitated mass is then run into the series of converting tanks; from now on the process is the same as with the lime-mud, except that the temperature-limits may be greater. Other alkaline bisulfites may also be made by this process.

I claim:

1. The process of making a soluble bisulfite, comprising heating a calcium compound in contact with a soluble sulfate and sulfur dioxid in a suitable vehicle, at a temperature between 30° C. and 90° C.

2. The process of making sodium bisulfite, comprising heating a calcium compound in contact with a sodium sulfate and sulfur dioxid, in a suitable vehicle, at a temperature between 30° C. and 90° C.

3. The process of making sodium bisulfite, comprising heating lime-mud in contact with a sodium sulfate and sulfur dioxid, in a suitable vehicle, at a temperature between 30° C. and 90° C.

4. The process of making a soluble bisulfite, comprising heating a calcium compound in contact with a soluble sulfate and sulfur dioxid in a suitable vehicle, at a temperature between 35° C. and 65° C.

5. The process of making sodium bisulfite, comprising heating a calcium compound in contact with a sodium sulfate and sulfur dioxid, in a suitable vehicle, at a temperature between 35° C. and 65° C.

6. The process of making sodium bisulfite, comprising heating lime-mud in contact with a sodium sulfate and sulfur dioxid, in a suitable vehicle, at a temperature between 35° C. and 65° C.

7. The process of making sodium bisulfite, comprising suspending calcium sulfite in a solution containing a sodium sulfate, and reacting on said solution and suspended calcium sulfite with sulfur dioxid at temperatures above 30° C. and below 90° C.

8. The process of making sodium bisulfite, comprising suspending calcium sulfite in a solution containing a sodium sulfate, and reacting on said solution and suspended calcium sulfite with sulfur dioxid at temperatures above 35° C. and below 70° C.

9. The process of making sodium bisulfite, comprising suspending calcium sulfite in a solution containing a sodium sulfate, and reacting on said solution and suspended calcium sulfite with sulfur dioxid at temperatures above 45° C. and below 65° C.

10. The process of making sodium bisulfite, comprising reacting upon calcium carbonate with sodium bisulfite, thereby forming calcium sulfite and sodium sulfite, adding a sodium sulfate, reacting upon the mixture of calcium sulfite, sodium sulfite and sodium sulfate with sulfur dioxid at temperatures above 30° C. and below 90° C., thereby forming calcium sulfate and sodium bisulfite, and recovering the sodium bisulfite.

11. The process of making sodium bisulfite, comprising reacting upon calcium carbonate with sodium bisulfite, thereby forming calcium sulfite and sodium sulfite, adding a sodium sulfate, reacting upon the mixture of calcium sulfite, sodium sulfite and sodium sulfate with sulfur dioxid at temperatures above 45° C. and below 65° C., thereby forming calcium sulfate and sodium bisulfite, and recovering the sodium bisulfite.

12. The process of making sodium bisulfite, comprising reacting upon lime-mud with sodium bisulfite, thereby forming calcium sulfite and sodium sulfite, adding a sodium sulfate, reacting upon the mixture of calcium sulfite, sodium sulfite and sodium sulfate with sulfur dioxid at a temperature above 45° C. and below 65° C., thereby forming calcium sulfate and sodium bisulfite, and recovering the sodium bisulfite.

In testimony whereof I affix my signature in presence of two witnesses.

HENRY HOWARD.

Witnesses:
I. M. Graham,
M. V. O'Brien.